United States Patent [19]

Gibson

[11] Patent Number: 4,820,535

[45] Date of Patent: Apr. 11, 1989

[54] PROCESS FOR PREPARING A REFORMED MEAT PRODUCT AND PRODUCT THEREOF

[75] Inventor: Royce G. Gibson, Murwillumbah, Australia

[73] Assignee: Tendapak Holdings PTY. Limited, Brisbane, Australia

[21] Appl. No.: 110,046

[22] Filed: Oct. 15, 1987

Related U.S. Application Data

[63] Continuation of Ser. No. 824,709, Feb. 19, 1986, abandoned.

[30] Foreign Application Priority Data

Apr. 19, 1984 [AU] Australia ............................. PG4670

[51] Int. Cl.$^4$ ............................................. A23L 1/317
[52] U.S. Cl. ................................... 426/272; 426/513; 426/646
[58] Field of Search ............... 426/272, 641, 646, 513

[56] References Cited

U.S. PATENT DOCUMENTS

| | | | |
|---|---|---|---|
| 1,503,864 | 8/1924 | Vogt | 426/272 |
| 3,285,753 | 11/1966 | Schwall et al. | 426/644 X |
| 3,740,235 | 6/1973 | Weiner | 426/646 |
| 3,863,017 | 1/1975 | Yueh | 426/513 X |
| 3,890,451 | 6/1975 | Keszler | 426/272 X |
| 3,911,154 | 10/1975 | Weatherspoon | 426/513 X |
| 4,539,210 | 9/1985 | O'Connell et al. | 426/272 X |

FOREIGN PATENT DOCUMENTS 20679 4/1972 Australia ............................. 426/272

Primary Examiner—Arthur L. Corbin
Attorney, Agent, or Firm—Browdy & Neimark

[57] ABSTRACT

A meat product comprising intimately mixed together sinewed meat which has been finely ground together to render the sinews therein substantially organoleptically undetectable and essentially sinewless meat which has been coarsely severed and subjected to a physical disorientation while substantially preserving its fibrous character. A process for forming such a meat product is also disclosed.

16 Claims, No Drawings

PROCESS FOR PREPARING A REFORMED MEAT PRODUCT AND PRODUCT THEREOF

This application is a continuation of application Ser. No. 824,709, filed Feb. 19, 1986, now abandoned.

The present invention relates to processed meat product and to a process for forming such meat products.

Traditionally butchering of mammalian stock involves removing the primal cuts of meat, which are relatively lean and unsinewed, from the animal for sale as individual items and utilising the remainder of the meat in a minced or ground form for use in sausages, rissoles, forcemeat and the like. The primal meat cuts achieve premium prices though in many cases they are not ideal for the consumer containing, as they can, significant quantities of bone and also a certain amount of fat. The minced product, which is usually made of sinewed meat, tends to sell at a relatively low price. These minced products are normally produced by mincing the sinewed meat to a degree sufficient to render the presence of the sinews, gristle and the like undetectable to a consumer. The necessary result of this very fine comminution of the sinewed meat is that the meat loses its fibrous character and becomes amorphous in character.

The present invention is directed to a meat product which includes both sinewed and sinewless meat and in which the fibrous character of the meat is retained.

The present invention consists in a meat product comprising intimately mixed together sinewed meat which has been finely ground to render the sinews therein substantially organoleptically undetectable and essentially sinewless meat which has been coarsely severed and subjected to a physical disorientation while substantially preserving its fibrous character.

In another aspect the present invention consists in a process for forming a meat product comprising grinding or mincing sinewed meat to such an extent that the sinews therein are rendered substantially organoleptically undetectable, coarsely severing substantially sinewless meat and subjecting it to a physical disorientation while substantially preserving its fibrous character, and intimately mixing the sinewed and the sinewless meat together.

The terms sinewed and sinewless meat are relative but are well understood in the meat trade. The sinewed meat will have a relatively high proportion of sinews or tendons traversing the meat while sinewless meat will be free, or substantially free, of such sinews. As the sinews are formed of collagen the collagen sinewless meat will always have a lower collagen content than the sinewed meat. In conventional terms the sinewless meat comprises the main muscle bundles which, in the case of cattle, might be sold as fillet, rump, T-bone or the like. The sinewed meat may be typically represented by shank or the like.

The product and process according to the present invention have the advantage that all of the meat from an animal may be sold as an essentially premium product free of bone, low in fat and with a pleasing texture and flavour. The preservation of the essentially fibrous character of the sinewless meat allows the product to be formed into a wide variety of saleable products which are essentially self-supporting i.e. the meat product does not need to be contained within a supporting package such as a sausage skin.

Ideally the process according to this invention will utilise all of the lean meat from any butchered beast, both the sinewed and the sinewless. Typically this will give to the present product a content of from 60 to 80% by weight sinewless meat and 20 to 40% by weight sinewed meat. Obviously there are situations where this is not ideal and the proportions may be varied widely within the broad ambit of this invention. The meat included in the product is preferably trimmed if necessary to give the product a fat content of 10 to 30% by weight.

The sinewed meat is most readily processed by being manually stripped from the carcass of the animal, trimmed to remove excess fat and finely minced in a conventional mincer. In a particularly preferred embodiment of the invention this meat is passed once through a mincer such as a "Hobart" (Registered Trade Mark) mincer having a four bladed cutter and fitted with a number 5 plate. The minced product is in the form of small pellets having a maximum particle diameter of, say, 5 mm. When smeared between the fingers this ground sinewed meat, in common with traditional "sausage mince", has no clearly distinguishable fibrous character and the sinews, gristle and the like has been sufficiently well disintegrated as to cause no disagreeable organoleptic sensations.

The sinewless meat is severed into lumps and simultaneously or subsequently subjected to a physical disorientation. The expression "physical disorientation" means any step which breaks up the meat lumps substantially without destroying the essentially fibrous nature of the meat proteins. When pressed between the fingers the physically disoriented sinewless meat should freely smear apart while showing clearly visible meat fibres. Ideally the treated sinewless meat, in an uncooked and chemically untreated state, will contain fibres of from 2 mm to 20 mm and possibly even longer. This severed and disoriented sinewless meat should not be confused with meat which has merely been diced without having been subjected to the physical disorientation. In the case of meat merely diced it would not be possible to bring about an intimate mixing between the sinewed and sinewless meats which is essential to this invention.

The sinewless meat is most preferably boned from the animal in a conventional way, trimmed of excess fat and passed once through a mincer, such as a "Hobart" mincer, fitted with a two bladed cutter and a plate having 12.5 mm diameter holes. The passage through such a mincer produces not only a severing of the meat but also an initial physical disorientation of the meat fibres.

The intimate mixing of the finely ground sinewed meat and the sinewless meat, together with a further physical disorientation of the fibres in the sinewless meat, is brought about by roughly mixing together the sinewed and sinewless meats and passing them at least once, and preferably up to four times, through a mincer fitted with a two bladed cutter and a 12.5 mm apertured plate. Obviously the exact mechanism for achieving the mixing of the meats and the disorientation of the fibres in the sinewless meat may be varied widely within the broad ambit of this invention.

If desired flavourings and other ingredients may be added to the product at the time of mixing the sinewed and sinewless meats together. Such ingredients may be dry or liquid. Typical drying ingredients may be rice flour, plain flour, garlic or onion flakes, lemon flavouring, seafood spice, salt and other seasonings. Typical liquid additives include smoke flavourings.

The product according to this invention may be extruded into "meat fingers" such as by a machine the subject of the present applicant's copending Australian patent application (PG4671) entitled "Material Forming Apparatus" or may be formed into a block by a machine the subject of the present applicant's copending PCT application (PCT/AU84/00186) entitled "Method and Apparatus for Meat Processing". In the latter case the block of meat may be cooled and sliced. In either case the formed meat product may be battered and bread crumbed or otherwise coated. Such products may be developed as boneless lamb cutlets; steak fillets; kekabs or shashliks; poultry roundlings; chicken "steaks"; plain, battered or crumbed meat fingers; matured veal fillets.

The meat used in the product and process according to this invention may come from any suitable source including butcherable mammals, birds, reptiles or fish. Normally the sinewed or sinewless meat will come from the same animal type though this is not essential and one could draw the sinewed and sinewless meats from different animal types. In a further embodiment the product may include sinewed meat from two or more sources and/or sinewless meat from two or more sources.

The meat product and the process for making the meat product according to this invention will be hereinafter described in detail with reference to the following example.

A meat product based on lamb having a slight onion flavour was made as follows:

1 kg of sinewless meat derived from the fillet of a lamb carcass was prepared by trimming the excess fat. 1 kg of sinewed meat derived from the shanks of a lamb carcass was similarly prepared. An 800 g portion of the prepared sinewless meat was then passed once through a Hobart mincer fitted with a two bladed cutter and a plate having 12.5 mm holes in order to produce an initial disorientation of the meat fibres. The length of meat fibres after this treatment were estimated to be in the range of 2–20 mm.

An 800 g portion of the prepared sinewed meat was then minced by being passed once through a Hobart mincer fitted with a four bladed cutter and a No. 5 plate. A 600 g portion of the treated sinewless meat and a 400 g portion of the mixed sinewed meat where then mixed in a Hobart mixer. Whilst mixing, a small amount of dry onion flavouring was added. Once they had been roughly mixed, the mixture was passed four times through a Hobart mincer fitted with a two bladed cutter and a plate having 12.5 mm holes.

The resultant product was found to have a fat content of 15% by weight and an organoleptically acceptable profile.

I claim:

1. A process for forming a meat product, comprising the steps of:
   grinding or mincing sinewed meat derived from mammals or poultry to such an extent that the sinews therein are rendered substantially organoleptically undetectable;
   coarsely severing sinewless meat derived from mammals or poultry;
   subjecting said coarsely severed sinewless meat to physical disorientation while substantially preserving its fibrous character to such an extent that when said physically disoriented sinewless meat is pressed between a person's fingers, it freely smears apart while showing clearly visible meat fibers;
   roughly mixing the sinewed meat and the sinewless meat together;
   subjecting the roughly mixed meat to a further physical disorientation of the fibers of the sinewless meat to intimately mix the sinewed meat with the sinewless meat; and then
   forming the resulting intimately mixed meat into a self-supporting product.

2. The process of claim 1 wherein the fat of the sinewed and sinewless meats is reduced by trimming to give the meat product a fat content of from 10 to 30% by weight.

3. The process of claim 2 wherein the sinewed meat is minced using a mincer fitted with a four bladed cutter and a plate which minces said sinewed meat into pellets having a maximum diameter of about 5 mm.

4. The process of claim 3 wherein the sinewless meat is treated by subjecting it to said physical disorientation in a manner such that the treated sinewless meat contains fibres of from 2 mm to 20 mm in length.

5. The process of claim 4 wherein said further disorientation of the fibres in the sinewless meat is brought about by passing said roughly mixed meat at least once through a mincer fitted with a two bladed cutter and a 12.5 mm apertured plate.

6. The process of claim 5 wherein the minced sinewed meat and disoriented sinewless meat are passed four times through the mincer.

7. The process as claimed in claim 6 wherein a flavouring is added at the time of mixing the sinewed and sinewless meats.

8. The process of claim 1 wherein the sinewed meat and the sinewless meat are mixed to form a meat product containing from 20 to 40% by weight of sinewed meat and from 60 to 80% by weight of sinewless meat.

9. The process of claim 8 wherein the sinewed meat is minced using a mincer fitted with a four blade cutter and a plate which minces said sinewed meat in pellets having a maximum diameter of about 5 mm.

10. The process of claim 8 wherein the sinewless meat is treated by subjecting it to said physical disorientation in a manner such that the treated sinewless meat contains fibers of from 2 mm to 20 mm in length.

11. A reconstituted meat product produced according to claim 1.

12. A meat product as claimed in claim 11 in which the fat content of the meat product is from 10 to 30% by weight.

13. A meat product as claimed in claim 12 in which the sinewless meat content of the meat product contains fibers of from 2 mm to 20 mm in length.

14. A meat product as claimed in claim 11 in which the content of sinewed meat is from 20 to 40% by weight and the content of sinewless meat is from 60 to 80% by weight.

15. A meat product as claimed in claim 11 in which the sinewless meat content of the meat product contains fibres of from 1 mm to 20 mm in length.

16. A meat product as claimed in claim 11 further comprising flavoring selected from the group consisting of rice flour, plain flour, garlic, onion flakes, lemon flavouring, seafood spice, salt and smoke flavouring.

* * * * *